United States Patent [19]

Palmer

[11] Patent Number: 5,450,591
[45] Date of Patent: Sep. 12, 1995

[54] CHANNEL SELECTION ARBITRATION

[75] Inventor: Michael J. Palmer, North Baddesley, United Kingdom

[73] Assignee: International Business Machines Corporation, Armonk, N.Y.

[21] Appl. No.: 934,549

[22] PCT Filed: Feb. 19, 1991

[86] PCT No.: PCT/GB91/00252
    § 371 Date: Oct. 9, 1992
    § 102(e) Date: Oct. 9, 1992

[51] Int. Cl.⁶ .............................................. G06F 13/00
[52] U.S. Cl. ................................... 395/293; 395/729; 395/848
[58] Field of Search .................. 395/725, 325, 275, 425

[56] References Cited
U.S. PATENT DOCUMENTS

| 4,096,569 | 6/1978 | Barlow | 395/325 |
| 4,130,864 | 12/1978 | Schlotterer | 395/725 |
| 4,612,542 | 9/1986 | Pantry et al. | 340/825.5 |
| 4,745,548 | 5/1988 | Blahut | 395/325 |
| 4,752,872 | 6/1988 | Ballatore et al. | 395/325 |
| 4,760,515 | 7/1988 | Malmquist et al. | 395/325 |
| 4,901,234 | 2/1990 | Heath et al. | 395/425 |
| 4,998,030 | 3/1991 | Cates | 395/425 |
| 5,179,705 | 1/1993 | Kent | 395/725 |

Primary Examiner—Jack B. Harvey
Assistant Examiner—Glenn A. Auve
Attorney, Agent, or Firm—J. Michael Anglin; Richard E. Billion

[57] ABSTRACT

A system for arbitration between competeting channels in, for example, a direct memory access (DMA) controller is described. The system arbitrates much more fairly than in the traditional 'round robin' approach, especially when channel requests are not independent but instead are made and withdrawn simultaneously by groups of channels. A 'turn-taken' latch is defined, and is consulted when a channel selection is made. This latch is set when a channel is serviced, and priority is given to requesting channel for which the latch is not set. When the latch is set for all of the requesting channels, an arbitrary winner is selected and the latch is reset for all except the winning channel.

6 Claims, 5 Drawing Sheets

CHANNEL SELECTION ARBITRATION

BACKGROUND OF THE INVENTION

The present invention relates to a circuit and method for arbitration between channels competing for selection, and to a data processing system employing such a circuit.

It is common for electronic devices to be connected to a number of peripheral devices, or channels, and to select one channel for servicing at any one time. An example of this is found in the field of direct memory access (DMA) data transfer in a computer system, in which data is transferred by a number of different 'slave' devices, or channels, primarily to and from the main memory, without using the central processing unit (CPU). Typically a DMA controller is used to supervise and control these data transfers. Bypassing the CPU usually allows higher data transfer rates and also frees the CPU for other processing tasks.

In a system in which a number of peripheral devices compete for use of a single DMA data bus, the DMA controller must arbitrate between simultaneously received DMA requests, granting one channel the use of the DMA data bus at any one time. This arbitration should be performed in a 'fair' way, so that each requesting device is allocated a reasonable share of the use of the data bus.

A further complication arises when the DMA channels are arranged to request access to the DMA data bus in groups, rather than independently. This may occur, for example, when a number of DMA channels are arranged to transmit data on a single bus or along a single cable in a packet-multiplexed manner. In this case, requests from all the channels within the group will be received simultaneously, and all of these requests will be removed when any of the channels within the group is service. There will be a pause while the packet is transmitted, and then all of the channels in that group will request again. The DMA controller must allocate bus usage fairly within each group, as well as between groups.

One prior art request arbitration method is the so-called 'rotating priority' or 'round robin' approach, as used in several commercially available DMA controllers such as the Motorola MC6844 (described in 'Motorola Microprocessor, Microcontroller and Peripheral Data, Volume II', 1988 pages 3-1757 to 3-1773) and the Intel 8237A and 8257A (described in 'Intel Microsystem Components Handbook—Microprocessors and Peripherals' Volume 1, pages 2-61 to 2-88). In this system each channel is assigned a priority value. At any time the requesting channel having the highest priority is allowed access to the DMA data bus; that channel is then assigned the lowest possible priority, and the priority of each of the other channels is incremented. The next DMA access is given to the new highest priority requesting channel.

The rotating priority scheme works well when the requesting channels are all independent, but does not provide fair arbitration between competing requests when the channels are organised into groups. In this latter situation, requests by some of the channels may never be serviced. This problem will be described further below with reference to certain of the accompanying drawings.

Another prior art arbitration scheme is described in GB 2202977, in which the channels transmit a priority value to a DMA controller on a separate arbitration bus. The controller then compares this value with one stored within the controller before deciding whether to grant DMA access to that channel.

SUMMARY OF THE INVENTION

According to the present invention on there is provided an arbitration circuit for selecting a winning channel from a plurality of channels requesting selection, comprising: a memory element corresponding to each channel; first logic means for determining whether the memory element for any of the requesting channels is in a first state; and second logic, means responsive to a positive determination by the first logic means, for selecting as winner one of the requesting channels for which the memory element is in said first state, and for setting the memory element corresponding to the winning channel to a second state.

An arbitration circuit according to the invention solves the problems described above by providing a fair arbitration both within and between groups of simultaneously requesting channels. When a particular channel is selected, or serviced, the memory element corresponding to that channel is set to the second state. In the broadest aspect of the invention, such a channel would then not be considered for subsequent selection.

In order that a selection can be made when all of the requesting channels have been serviced, the arbitration circuit: preferably includes third logic means, responsive to a negative determination by the first logic means, for selecting as winner one of the requesting channels, and for setting the memory element corresponding to each requesting channel except the winning channel to the first state.

Although the second and third logic means could select a winning channel from the appropriate group of eligible channels by a random decision, it is preferred that this selection be made according to a predetermined order of priority between the channels. It is further desirable that the second and third logic means include means for preventing the selection of more than one requesting channel as winner.

In a preferred embodiment, the arbitration circuit is arranged as a plurality of interlinked sub-circuits, each sub-circuit corresponding to a single channel and including the memory element corresponding to that channel. This allows the circuit to be designed and constructed in a modular manner.

Although any sort of register or latch could be used, it is preferred that the memory element is a set-dominant set-reset (RS) latch.

Viewed from a second aspect the present invention also provides a data processing system including a direct memory access (DMA) controller comprising an arbitration circuit according to the invention, and further comprising: at least one memory device; at least one data handling device; and interconnecting buses; wherein DMA transfers can be made between the memory device(s) and the data handling device(s) via the DMA controller.

Viewed from a third aspect the invention further provides a method of selecting a winning channel from a plurality of channels requesting selection, wherein a memory element associated with each channel can be set to one of at least two states, comprising the steps of: determining whether the memory element corresponding to any of the requesting channels is in a first state;

and, if so, selecting as winner one of the requesting channels for which the memory element is in the first state, and setting the memory element corresponding to the winner to a second state.

BRIEF DESCRIPTION OF THE DRAWINGS

In order that the invention may be fully understood a preferred embodiment thereof will now be described, by way of example only, with reference to the accompanying drawings in which.

DESCRIPTION OF THE PREFERRED EMBODIMENT

Figure 1:
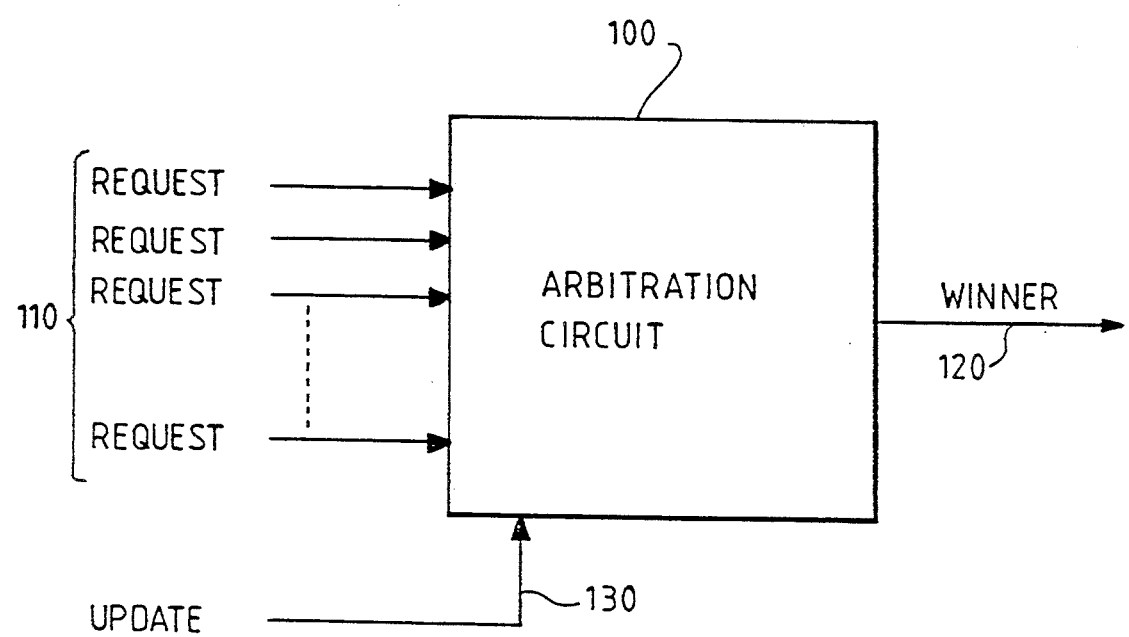
FIG. 1 shows a block diagram o;f an arbitration circuit as known in the prior art.

Referring now to FIG. 1 an arbitration circuit 100, as known in the prior art, receives selection requests 110 from a number of channels (not shown). The arbitration circuit 100 selects a channel to be serviced (the 'winner') and indicates the identity of the winner on output 120. When the winning channel is serviced a pulse is applied to the update input 130 of the arbitration circuit, to indicate that an arbitration cycle is complete and the arbitration circuit should now evaluate the next winning channel according to its current requests 110.

When more than one request input 110 is active, the winners in consecutive cycles should be selected in a fair manner, so that over a large number of cycles each requesting channel is the winner for a reasonable number of cycles.

Figure 2:
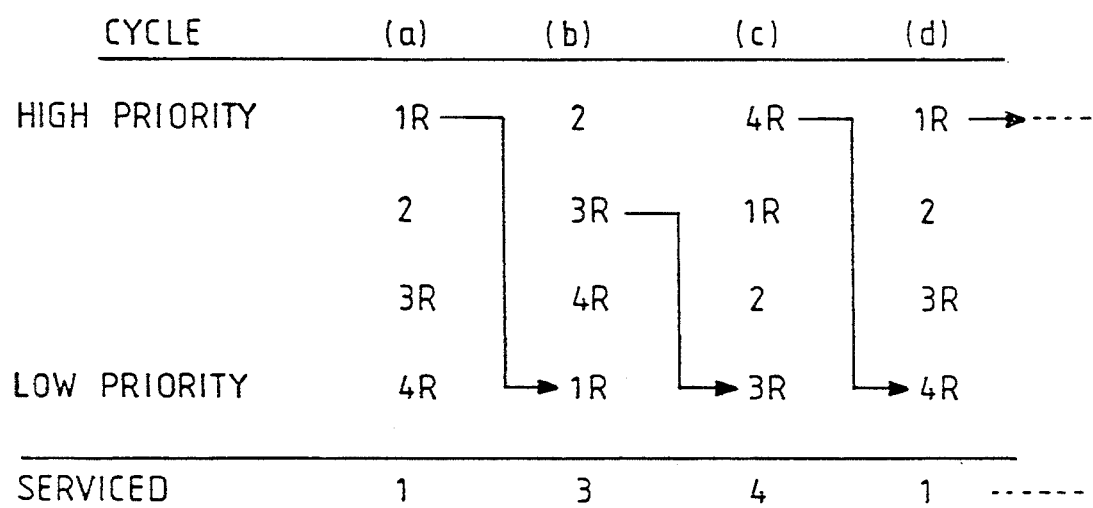
FIG. 2 shows schematically the use of the rotating priority scheme in a system comprising four channels independently requesting selection.

FIG. 2 shows the use of the prior art 'rotating priority' system in the case of four independently requesting channels 1,2,3 and 4. In the figure, an 'R' indicates that that channel is currently requesting selection. In each cycle, the highest priority channel is shown at the top of the figure. At the beginning of the first cycle, cycle (a), the channels are assigned arbitrary priority values, with channel 1 having the highest initial priority.

Throughout FIG. 2, only three of the channels 1,3 and 4 are shown making requests to the arbitration circuit. Accordingly in cycle (a) channel 1 is the highest priority of those requesting service, and so becomes the winner. In cycle (b) the winner from cycle (a) becomes the lowest priority channel, and the highest priority requesting channel (the winner) is channel 3. Similarly, in cycle (c) the priorities rotate so that channel 4 is the highest priority requesting channel, and so on.

In the situation shown in FIG. 2, the rotating priority arbitration scheme provides a fair arbitration between the requesting channels, in that each channel in turn becomes the highest priority channel, and therefore the winner for that cycle. However the same scheme applied to channels organised in groups does not lead to fair arbitration; this will be demonstrated below with reference to FIG. 3.

Figure 3:
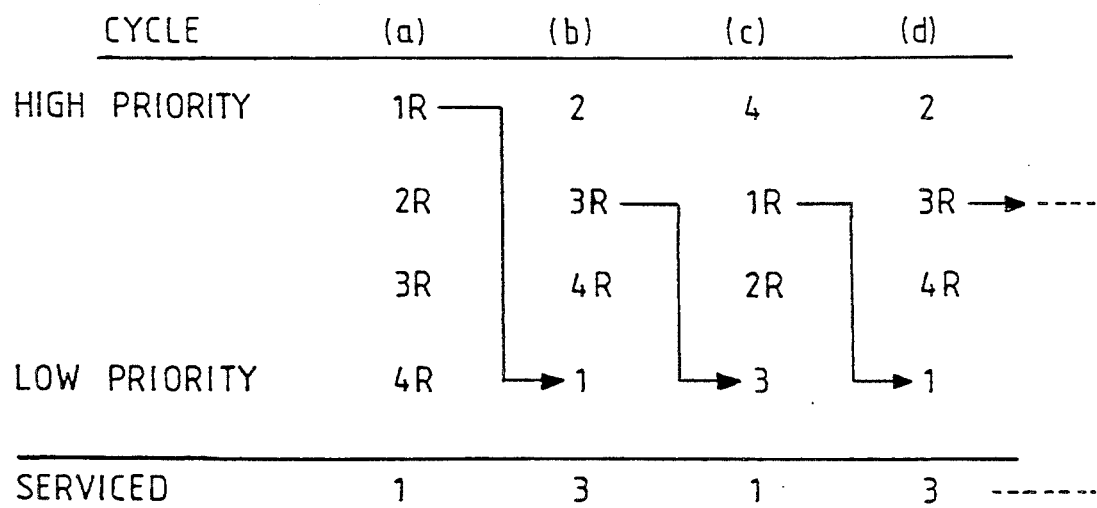
FIG. 3 shows schematically the use of the rotating priority scheme in a system comprising two groups of two channels requesting selection.

FIG. 3 shows schematically the use of the rotating priority scheme in a system comprising two groups of two channels requesting selection. In particular, channels 1 and 2 request together, and channels 3 and 4 request together. When an individual channel is serviced, all members of its group stop requesting, and reissue requests in time for the next cycle.

As in FIG. 2, in FIG. 3 the channels have been assigned an arbitrary order of priority at the start of cycle (a). In that cycle both groups of channels make requests, and channel 1 is serviced as the highest priority requesting channel. In time for cycle (b), channel 1 is assigned the lowest priority, while the priorities of the other channels are all incremented. In cycle (b) the group comprising channels 3 and 4 makes a request, and channel 3 becomes the winner. In cycle (c) the group comprising channels 1 and 2 requests, and channel 1 is made the winner. In cycle (d) channel 3 is again the winner.

It will be seen that in the situation shown in FIG. 3, in which the channel groups make requests on alternate cycles, the arbitration is far from being fair. In the example shown, while channels 1 and 3 are regularly serviced, channels 2 and 4 are never serviced.

An arbitration scheme according to the invention will now be described, with reference to FIGS. 4 and 5. The basis of the scheme is a 'turn-taken' latch or memory element (230, FIG. 5) corresponding to each channel, which is clocked at each arbitration cycle. From the state of this latch a fair arbitration decision can be made to decide which of the requesting channels should next be serviced.

Arbitration proceeds as follows:
1) For each channel, define a binary control value:
   PENDING=REQUESTING AND (NOT TURN_TAKEN)
2) Select one of the channels for which PENDING is set (for example, the lowest numbered channel) and service it.
   Set TURN_TAKEN latch for the channel serviced.
3) If no PENDING bits are set, but one or more channels are requesting (in other words, each requesting channel has had a turn), then:
   reset TURN_TAKEN for each channel which is REQUESTING; and
   redefine PENDING=REQUESTING The operation of this arbitration scheme is shown in FIG. 4, in which arbitration between channels numbered 1 to 4 is considered. In this figure the channels are organised as two groups of two (1,2); (3,4). An 'R' by the channel number indicates that that channel is currently requesting service—that is to say, its REQUESTING bit is set. Similarly, a 'T' indicates that the TURN_TAKEN latch for that channel is set. Seven arbitration cycles, (a) to (g), are shown.

Figure 4:
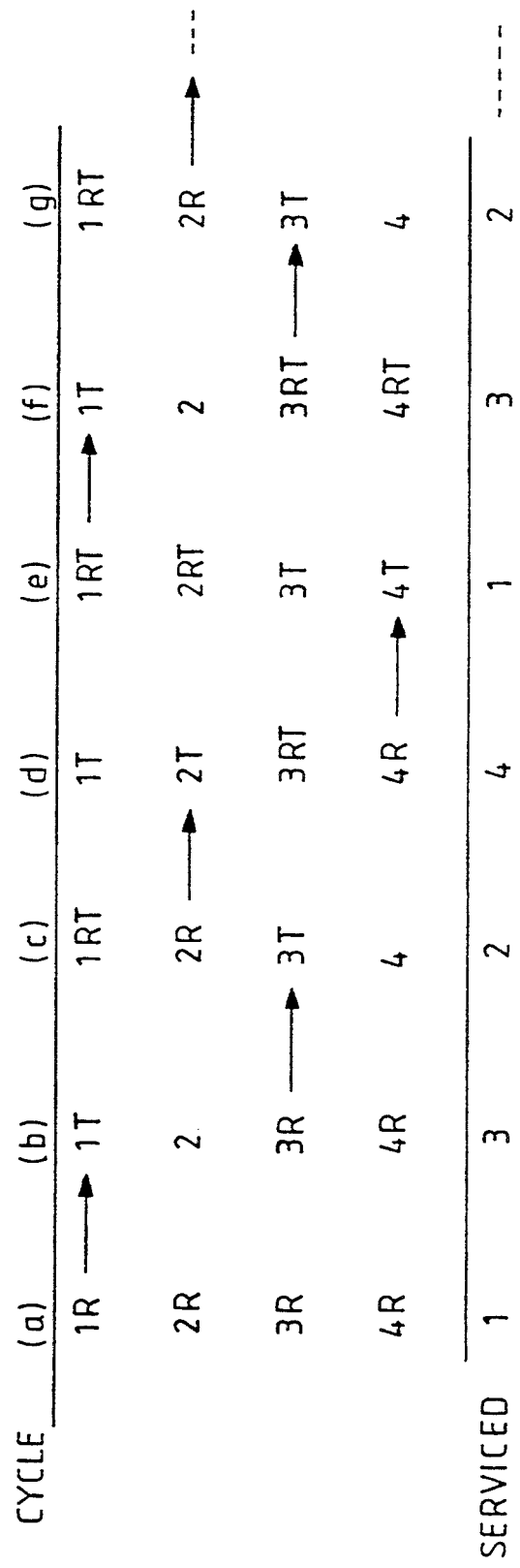
FIG. 4 shows schematically tile operation of an arbitration circuit according to the invention.

Referring to FIG. 4, all of the channels are requesting in cycle (a), but none of them has the TURN_TAKEN latch set. Therefore the PENDING bit is a logical '1' for each channel, and an arbitrary channel (in this case channel number 1, the lowest numbered channel) is selected for servicing. TURN_TAKEN for channel 1 is then set.

In cycle (b) channels 3 and 4 are requesting, and again the lowest numbered channel (channel 3) is selected because, at the time of selection, neither has its TURN_TAKEN latch set. As a result of its successful selection channel 3 then has its TURN_TAKEN latch set.

In cycle (c) channels 1 and 2 again make requests. From above, the binary value PENDING is calculated:

PENDING=REQUESTING AND (NOT TURN_TAKEN)
 =1 AND 0=0 for channel 1;
 =1 AND 1=1 for channel 2; and
 =0 for channels 3 and 4 (for which REQUESTING=0)

Therefore channel 2 is the only PENDING channel, and is therefore the winner. Its TURN_TAKEN latch ]s then set.

The situation is similar in cycle (d) in which channel 4 is the only requesting channel for which PENDING is a logical '1' and is therefore selected.

So far, in cycles (a) to (d), it has been possible to select a REQUESTING channel for which TURN_TAKEN is not set—in other words, a channel for which the value

PENDING=REQUESTING AND (NOT TURN_TAKEN)
 ='1'.

However, this is no longer possible in cycle (e), so the third step from the scheme above is required:

3) If no PENDING bits are set, but one or more channels are requesting (in other words, each requesting channel has had a turn), then:
 reset TURN_TAKEN for each channel which is REQUESTING; and
 redefine PENDING=REQUESTING Applying this step to cycle (e), channels 1 and 2 are REQUESTING, so both have a PENDING value of 1 by this new, temporary, definition. Accordingly, channel 1 is selected as the lowest numbered of the PENDING channels. TURN_TAKEN is reset for all REQUESTING channels, but in fact is set again for channel 1 to show that this channel has been the winner in that cycle.

The situation in cycle (f) is similar, in which both channels 3 and 4 are REQUESTING, but both have their TURN_TAKEN latches set. Similar reasoning to that used in connection with cycle (e) results in channel 3 being selected.

In the final example, cycle (g), channels 1 and 2 are REQUESTING. According to the original definition of PENDING,

PENDING=REQUESTING AND (NOT TURN_TAKEN), the PENDING bit is set for channel 2. It is therefore not necessary to rely on the arrangements in the third step of the scheme above, and channel 2 is selected in the normal manner.

Figure 5:
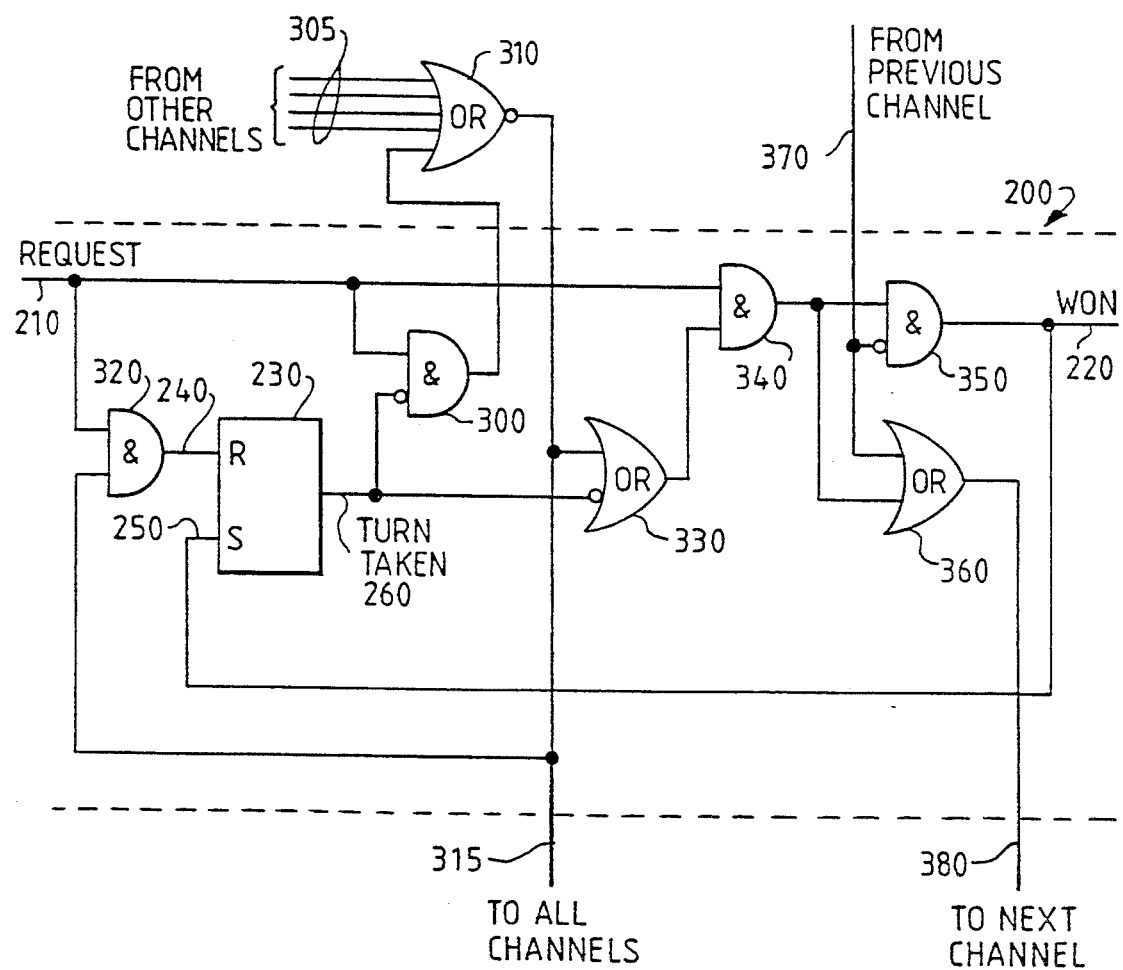
FIG. 5 shows a logic circuit diagram for one channel of an arbitration circuit according to the invention.

FIG. 5 shows a logic circuit diagram for one channel 200 of an arbitration circuit according to the invention. The circuitry shown between the dashed lines is repeated for each channel. Requests for selection are received as a logical '1' on the REQUEST input 210, and an indication that that channel is the winner of the arbitration during a particular cycle is provided by a logical '1' on the WON output 220.

The TURN_TAKEN latch 230 is a set-dominant set-reset (RS) latch, and is provided with suitable clocking pulses (not shown) from the UPDATE input 130 in FIG. 1. Its output 260 represents the value TURN_TAKEN.

The value PENDING is determined by AND gate 340, the output of which is equal to

REQUESTING (NOT TURN_TAKEN)

except under circumstances when no REQUESTING channels have their PENDING bit set (see below and step (3) above). It should be noted that an open circle on the input or output of a logic gate in FIG. 5 denotes a logical inversion of that input or output.

Logic gate 300 also produces a logical '1' as its output when REQUESTING is set but TURN_TAKEN is not (that is, PENDING='1' according to the first definition). The output from gate 300 and the equivalent gates in all of the other channels form inputs to NOR gate 310. Accordingly, the output of NOR gate 310 is a logical '1' only when all of its inputs are zero—that is, when no REQUESTING channel has its PENDING bit set. Under these circumstances only, the TURN_TAKEN latch is overridden by means of a logical '1' Applied to OR gate 330. This corresponds to the third step in the scheme described above, in which PENDING is temporarily redefined as being equal to REQUESTING. Also, a logical '1' is applied (via AN gate 320) to the R (reset) input 240 of the latch 230 for each REQUESTING channel. These latches will be reset on the next clock (UPDATE) pulse applied.

Returning to gate 340, it will now be seen that the output of this gate represents the value PENDING according to either of its two definitions given above. That is to say, PENDING normally equals

REQUESTING AND (NOT TURN_TAKEN), but when no REQUESTING channel has its PENDING bit set according to this first definition, PENDING is temporarily redefined as being equal to REQUESTING. Whichever definition is in force, PENDING is provided by gate 340.

One of the channels for which PENDING is set must now be selected as winner. In the example shown in FIG. 4, the lowest numbered PENDING channel was chosen as the winner. In the implementation shown in FIG. 5, gates 350 and 360 are used to achieve this predetermined but arbitrary selection between PENDING channels.

Gate 350 derives the logical value

WON=PENDING AND (NOT PREVIOUS), where PREVIOUS is the input on line 370. It will therefore be clear that in order for a particular PENDING channel to be selected as the winner, the value of PREVIOUS received by that channel on input 370 must be a logical '0'. For the particular winning channel selected, the output NEXT on output 380 will always be a logical '1'. Similarly, for a channel which is not PENDING, the output NEXT 380 will equal (PREVIOUS OR '0')=PREVIOUS. The output NEXT 380 for each channel (except the last) is connected to the input PREVIOUS 370 for the subsequent channel.

The effect of gates 350 and 360 is therefore as follows:
a) For a channel to win, its PREVIOUS input 370 must be a logical '0';
b) If any channel wins then its output NEXT 380 to the next channel will be a logical '1';
c) If the PREVIOUS input to a channel is a logical '1' then that channel's NEXT output 380 will automatically be a logical '1'.

Given that a channel must have its PENDING bit set (by either of the above definitions) in order to be the winner, it will now be clear that the first PENDING channel in the chain of NEXT 380 to PREVIOUS 370 connections will be selected as the winner. Any channels further on in the chain will receive a logical '1' on their PREVIOUS input 370, and will therefore be prevented from being the winner. As a result, in this embodiment, there can only be one winner.

The output WON 220 for each channel is also connected to the S (set) input 250 of latch 230. The effect of this is that the TURN_TAKEN latch is always set for the winning channel when the clock or UPDATE pulse is applied.

Figure 6:
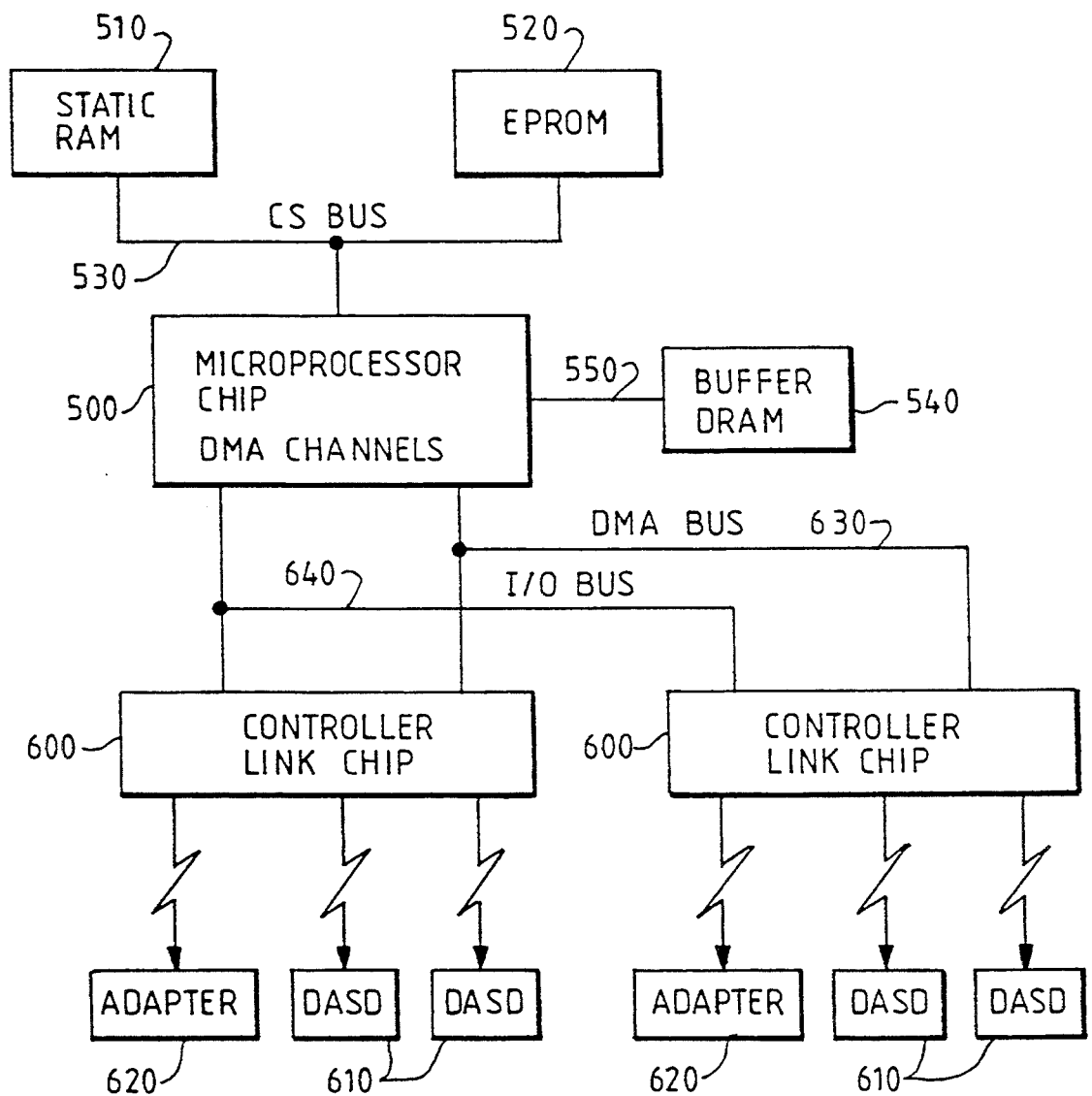
FIG. 6 shows a computer system in which an arbitration circuit according to the invention is incorporated in a DMA control device.

FIG. 6 shows a computer system in which an arbitration circuit according to the invention is incorporated in a DMA control device 500. The particular system shown is suitable for use as the control circuitry for a data storage subsystem comprising four DASDs or disk drives 610. In this system DMA transfers are required in both directions between the DASDs 610 and the buffer DRAM 540, and also in both directions between the buffer DRAM 540 and the adapters 620 (through which the storage subsystem communicates with its host (controlling) data processor).

The device 500 performs the functions of a DMA controller and, in this case, a general system control let, operating in this latter respect under the control of program code stored in the EPROM 520 and static RAM 510, both of which are connected t:o controller 500 via the CS (Control Store) bus 530.

The need for an arbitration circuit in the DMA controller 500 arises because each of the DASDs 610 includes 2 DMA channels, which can make requests as groups, the adapter has 4 DMA channels, and the DMA controller 500 has 3 internal DMA channels for internal transfers. Each of the 16 non-internal DMA channels can make requests via the DMA bus 630 and, if selected for a particular cycle, transfers a small packet of data via bus 630 and controller link chips 600.

Although the invention has been described with reference to an embodiment employing discrete logic gates, it will be clear that integrated circuit embodiments could easily be used. In addition, the invention could be implemented as a general purpose logic device, such as a microprocessor, under control of a computer program.

I claim as my invention:

1. Arbitration apparatus for selecting a winning channel from a plurality of channels requesting selection, said arbitration apparatus comprising:
    a separate REQUEST input line for each channel, indicating that said each channel is requesting service;
    a separate WON output line for each channel, indicating that one of said channels is said winning channel;
    a separate circuit for each of said channels, each said separate circuit including
        TURN_TAKEN memory means having an S state set when the WON output line for its own channel is active, and having an R state set either when both (a) said REQUEST line for its own channel is active and a PENDING signal for its own channel is active or (b) when no other channel has a PENDING signal active;
        first logic means for producing a PENDING signal when (a) its own REQUEST line is active and state R is set or when (b) said S state is set and no other of said separate circuits has its PENDING signal active; and
        second logic means for producing said WON signal on the output line of its own channel when both (a) said PENDING signal is active and (b) no WON signal from another channel is active.

2. The arbitration apparatus of claim: 1, further including
    third logic means for ordering each of said separate circuits in a priority order when the PENDING signal of more than one of said circuits is active.

3. The arbitration means of claim 2, wherein said third logic means of each of said circuits receives a PREVIOUS signal from a first other of said circuits and produces a NEXT signal coupled to the PREVIOUS signal of a second other of said circuits, for ordering said circuits in said priority.

4. The arbitration apparatus of claim 1, wherein said memory means sets said S state in the presence of said WON signal regardless of the state of its own REQUEST line.

5. A data processing system including a direct memory access (DMA) controller (500) comprising an arbitration apparatus as claimed in any preceding claim, said system further comprising:
    at least one memory device;
    at least one data handling device; and
    at least one interconnecting bus;
    wherein said memory device is coupled to channels in said data handling device via said DMA controller for DMA transfers between said memory device and said channels.

6. A method of selecting a winning channel from a plurality of channels requesting selection, each of said channels having a separate REQUEST input line indicating that said each channel is requesting service, and each of said channels having a separate WON output line indicating whether said each channel is said winning channel, said method comprising performing the following steps for each of said channels:
    setting an S state set when the WON output line for its own channel is active, and setting an R state set either when (a) said REQUEST line for its own channel is active and a PENDING signal for its own channel is active or (b) when no other channel of said plurality of channels has a PENDING signal active;
    producing a PENDING signal when (a) said each channel's own REQUEST line is active and state R is set, or (b) said S state is set and no other of said channels has its PENDING signal active; and
    producing said WON signal on said each channel's own WON line when both (a) said PENDING signal is active and (b) no WON signal from another channel is active.

* * * * *